United States Patent [19]
Matre

[11] Patent Number: 4,991,298
[45] Date of Patent: Feb. 12, 1991

[54] EXTENDIBLE TREE TRIMMING APPARATUS

[75] Inventor: Daniel A. Matre, Wauwatosa, Wis.

[73] Assignee: David K. Caruso, Wauwatosa, Wis.

[21] Appl. No.: 243,983

[22] Filed: Sep. 13, 1988

[51] Int. Cl.⁵ .............................................. A01G 3/08
[52] U.S. Cl. .................. 30/392; 30/272.001; 30/296.001; 30/371; 30/166.003
[58] Field of Search ................ 30/166 R, 296 R, 383, 30/382, 392, 394, 272 R, 122, 353, 355, 166 A, 371, 378, 501, 502, 166.3, 296.1, 272.1; 403/109, 374; 464/46

[56] References Cited

U.S. PATENT DOCUMENTS

| | | | |
|---|---|---|---|
| 2,399,393 | 4/1946 | Schillinger | 30/371 |
| 2,619,721 | 12/1952 | King | 30/371 |
| 2,703,928 | 3/1955 | Southwick | 30/386 |
| 2,777,483 | 1/1957 | Cherem | 143/43 |
| 2,815,048 | 12/1957 | Davis | 143/32 |
| 3,033,251 | 5/1962 | Atkinson et al. | 30/353 X |
| 3,291,167 | 12/1966 | Varden | 143/32 |
| 3,596,525 | 8/1971 | Niesz | 30/392 X |
| 3,625,292 | 12/1971 | Lay | 464/46 X |
| 3,657,813 | 4/1972 | Knight | 30/166 |
| 3,715,805 | 2/1973 | Fraser | 30/166 |
| 4,122,601 | 10/1978 | Katsuya | 30/296 |
| 4,452,316 | 6/1984 | Edwards | 30/277 X |
| 4,505,040 | 3/1985 | Everts | 30/296 |
| 4,596,484 | 6/1986 | Nakatani | 403/109 X |
| 4,654,971 | 4/1987 | Fettes et al. | 30/383 |
| 4,757,613 | 7/1988 | Baudreau et al. | 30/383 |
| 4,760,646 | 8/1988 | Siegler | 30/382 |
| 4,785,540 | 11/1988 | Arvidsson | 30/381 X |

*Primary Examiner*—Frank T. Yost
*Assistant Examiner*—Rinaldi Rada

*Attorney, Agent, or Firm*—Andrus, Sceales, Starke & Sawall

[57] ABSTRACT

An extendible tree trimmer includes an extendible tube unit with a motor and a cutting blade connected to the opposite ends. The tube unit includes a first housing and a telescopic second housing connected by a releasable coupling unit. A first shaft connected to the motor extends through the first housing and second shaft is telescoped with the first shaft and extends through the second housing to the cutting blade. The housings are releasably coupled for telescoped positioning. A rotary bearing supports the shafts in the housings. A gear reduction unit and a slip clutch unit connects the motor to the first shaft. The cutter head includes a rotating cam secured to the second shaft. The cam has a peripheral groove with axially offset portions and with a follower in said groove. The follower is secured to the blade which reciprocates in the plane of the blade. The blade has teeth on the opposed edges to cut with the blade moving toward the housing. The face of the cutter support is S-shaped with a concave upper wall and a convex lower wall for engaging a limb. The bearing includes an inner race having a hexagonal cross-section in sliding coupling to the first shaft of corresponding cross-section. An enlarged outer guide head releasably on the end of the first shaft slides within the tubular shaft. The second shaft is tubular and is secured to the inner race connecting said tubular shaft to said first shaft for simultaneous rotation with the first shaft. The outer race of the bearing has a stepped surface secured to the second housing and slidable within the first housing. A handle is secured to the housing by a pivot connection such that the handle is horizontal for all positions of the trimmer.

12 Claims, 3 Drawing Sheets

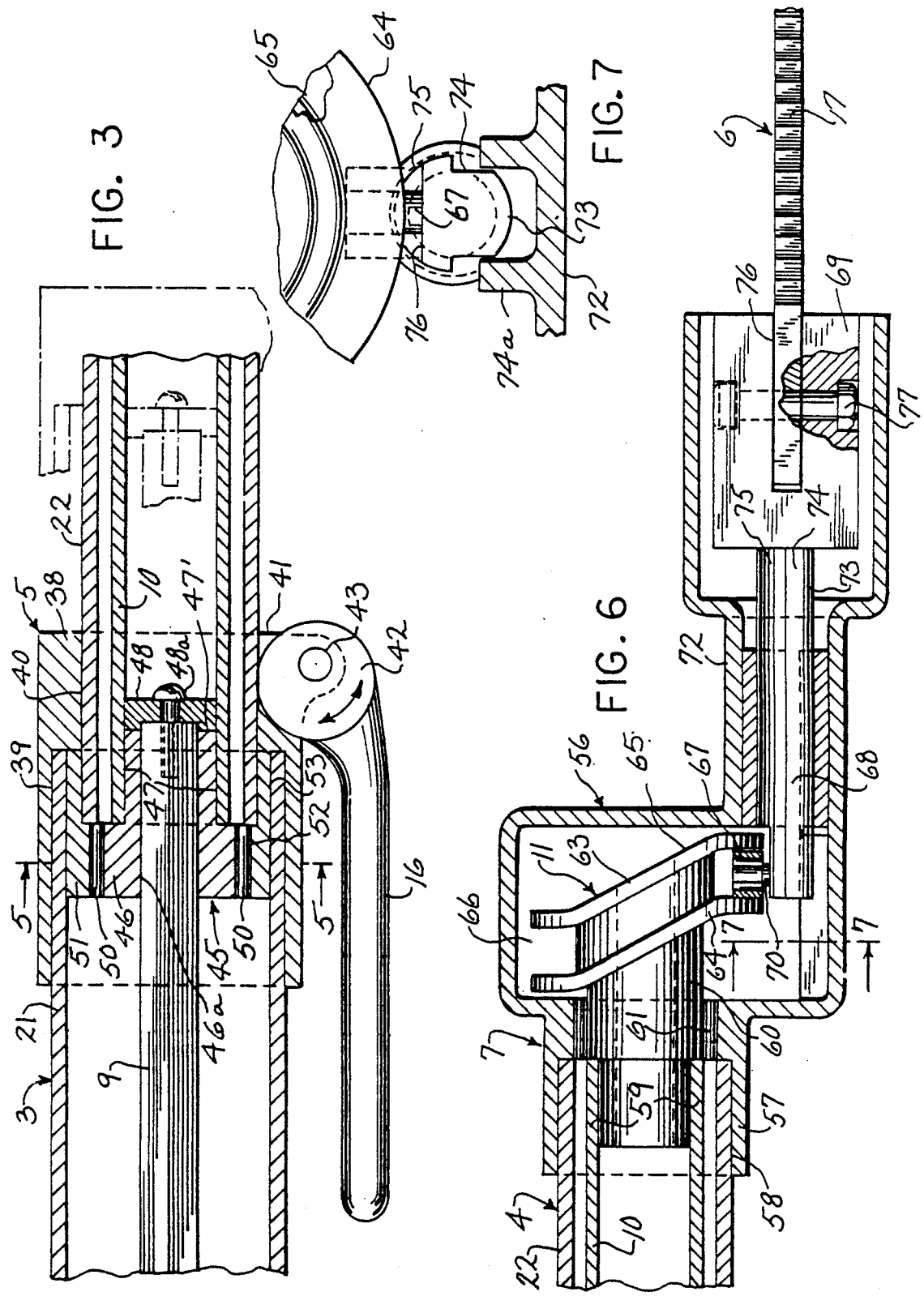

EXTENDIBLE TREE TRIMMING APPARATUS

BACKGROUND OF THE PRESENT INVENTION

The present invention relates to extendible tree trimming apparatus and particularly to such apparatus which is adapted to be manually manipulated.

Trimming of trees often requires removal of limbs from the upper and top portion of the tree, which are not readily and safely accessible from ground level without use of ladders or the like. Climbing of the tree with cutting equipment, particularly power equipment, is not only inconvenient but hazardous. Professional and commercial tree trimmers generally use truck-mounted power equipment having cutting devices which can be extended upwardly into the tree for remote cutting of limbs from within the tree. Smaller portable and manually manipulated tree trimming devices have been suggested for use by the owner and others in trimming of trees. For example, U.S. Pat. No. 3,715,805 which issued on Feb. 13, 1973 and is entitled "Tree Pruning Saw" discloses a multiple section tree trimmer for varying the length of the device. A motor at the lower end is coupled through a drive shaft mechanism to a cutting blade mechanism at the upper end. U.S. Pat. No. 4,654,971 which issued on Apr. 7, 1987 and is entitled "Pruner With Collapsible Drive Shaft And Housing" also discloses an extendible telescopic multiple section tree trimming apparatus. The structure of this latter part includes an outer telescopic housing unit and an inner telescopic drive shaft unit permitting extension and collapse of the tree trimming apparatus. A locking means allows setting of the unit in the various adjusted extended position. The patent particularly discloses a single sliding sleeve bearing floating between the telescopic housing unit and the telescopic shaft unit to provide a complete separation of the extendible housing and drive shaft sections or units. Other extendible cutting devices have been suggested and are discussed in the above prior art.

The extendible nature of the apparatus requires special consideration be given to the coupling of the sections to provide a long reliable and operative life. In addition, providing a proper transmission of the torque from the power source at the lower end of the extendible tree trimming apparatus to the remotely located cutting apparatus is also significant in order to provide an effective tree trimming apparatus. The transmission of the torque from an electric or gas motor to the cutting apparatus must, for example, include an efficient power transfer to permit use of a relatively small compact power source which in turn permit convenient manual handling of the tree trimming apparatus. In addition for effective transfer of power to the upper cutting head, translation of the rotary shaft unit to movement of the cutting mechanism must be efficient, reliable and have a long operating life, with minimum service and maintenance requirements. Although the end user may have certain skills and capabilities, the end user often tend the use the equipment without giving due consideration to servicing of the equipment until the equipment malfunctions or fails.

There is therefore a distinct need for an efficient and long life tree trimming apparatus which is lightweight for convenient manual manipulation while providing effective and efficient cutting at the remote end of the tree trimming apparatus.

SUMMARY OF THE PRESENT INVENTION

The present invention is particularly directed to extendible tree trimming apparatus having a lower power head and a top cutting head connected by a telescopic housing unit and drive shaft unit with efficient torque transfer at the cutting head and particularly to a reciprocating cutting blade. Generally in accordance with the present invention, telescopic housing sections of housing unit and telescopic drive shaft sections of the drive shaft unit are of a similar extent or length. An adjustable coupling interconnects the housing sections and the shaft sections to form an integrated connection. A multiple rotary bearing assembly interconnects the housing section to the drive shaft section. The multiple rotary bearing assembly includes an internal ball or pin roll bearing connecting unit. The opposed shaft and housing of the units are telescopically and slidably coupled to the rotary bearing unit and establish a highly stable and efficient power transfer in all of the various extended positions of the telescopic units.

The lower power source may be an electric motor, a small gasoline engine or the like. An electric motor provides a simple and relatively inexpensive drive system. In accordance with one feature of the present invention, an electric motor is coupled to a drive shaft unit through a gear reduction unit for increasing of the torque input to the extendible drive shaft unit. This has been found to contribute to the effective powered operation of the cutting head.

The cutting head in accordance with a further unique feature of the present invention include a reciprocating cutting blade coupled to the rotating shaft through a cam drive or coupler for converting of the rotating motion of the shaft unit to a reciprocating blade motion. The cam drive coupler preferably includes a rotating annular cam having a peripheral annular groove. The annular groove has a pair of oppositely located circumferential flat portions extending on a diametrical plane through the drive shaft axis. The flat portions are joined by inclined portions. A roller follower is coupled to the end of the blade and is located within the cam groove. Rotation of the cam reciprocates the follower, and attached blade. The inventors found that the cam transfer provides a highly efficient and reliable coupler having a long operating life.

The cutting blade is preferably a flat blade having a curved outer end. Cutting teeth are provided to the opposite edges of the blade. The teeth are preferably formed to cut on the inward or pulling stroke, such that a tree limb can be undercut without tearing of the bark.

BRIEF DESCRIPTION OF THE DRAWINGS

The drawings furnished herewith generally illustrate the best mode presently contemplated for the invention and are described hereinafter.

In the drawings:

FIG. 3 is a fragmentary and longitudinal sectional view of the coupling between the telescopic units of the tree trimming apparatus shown in FIG. 1;

FIG. 4 is a vertical section taken generally on line 4—4 of FIG. 1;

FIG. 5 is an enlarged sectional view taken generally on line 5—5 of FIG. 3 with parts broken away and sectioned to more clearly illustrate detail of the coupler;

FIG. 6 is an enlarged longitudinal section of the cutter head of the telescopic tree trimming apparatus shown in FIG. 1; and FIG. 7 is a partial sectional view taken generally on line 7—7 of FIG. 6.

DESCRIPTION OF THE ILLUSTRATED EMBODIMENT

Figure 1:
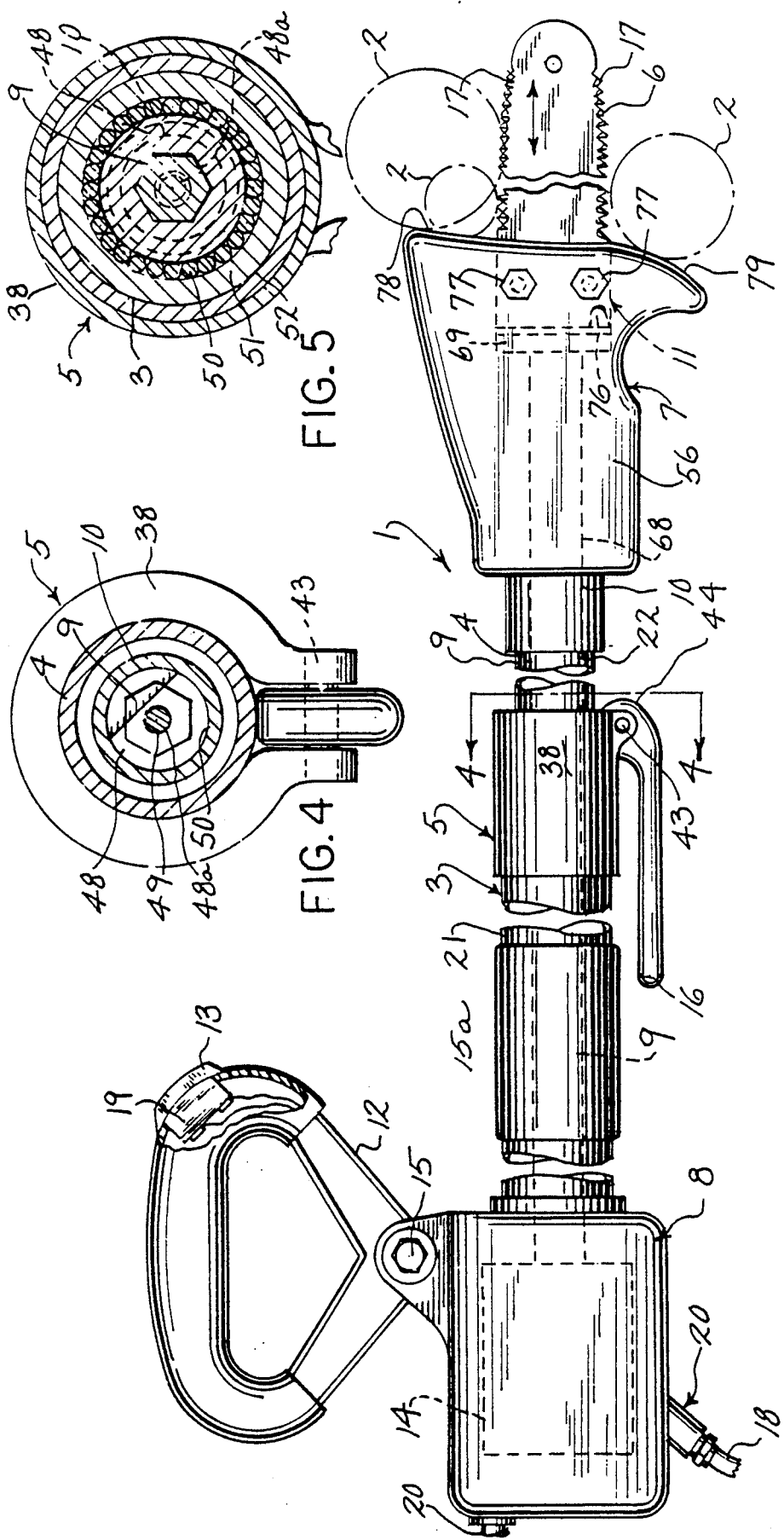
FIG. 1 is a side elevational view of a telescopic tree trimming apparatus incorporating an embodiment of the present invention.

Referring to the drawings and particularly to FIG. 1, the telescopic tree trimming apparatus 1 is illustrated with different sizes and oriented tree limbs, shown in phantom position for cutting. The tree trimming apparatus 1 is shown in a horizontal position in FIG. 1. In actual practice, the tree trimming apparatus 1 is held at ground level with the cutting end projected upwardly into engagement with a tree limb 2, as more fully developed hereinafter. Generally, the illustrated embodiment of the invention includes a pair of telescopic and extendible units including a lower assembly 3 and an upper assembly 4, with the assemblies telescopically interconnected to each other by a releasable coupling unit 5. A reciprocating saw blade 6 is mounted for linear reciprocation in a cutter head or unit 7 secured to the outer end of the telescopic upper assembly 4. A power head or unit 8 is secured to the opposite and outer end of the lower assembly 3. The power head 8 is coupled to drive the cutter head 7 and particularly the blade 6 with a desired reciprocating motion for cutting of a limb 2. The power head 8 drives a shaft 9 forming a part of the assembly 3. A tubular shaft 10, forming a part of assembly 4, is slidably coupled to the shaft 9 and connected through a rotary to a linear motion converter or coupling 11, forming a part of the cutter head 7.

A support handle 12 is secured to the power head 8 and includes a control switch 13 for energizing of a motor 14 in power head 8. The handle 12 is shown as a continuous loop member connected to the power head 8 by a pivot unit 15. The extendible tree trimming apparatus 1 can be pivoted about the handle 12 while maintaining of the handle in a convenient horizontal support position or the like for locating the upper end of the tree trimming apparatus within the tree. A hand grip 15a is connected to the lower housing 3 in outwardly spaced relation to the power head 8. The grip 15a is located for convenient gripping by the user to support the assembly projecting upwardly with the handle 12 in the horizontal holding position 2.

The coupling unit 5 includes a release lever 16 to permit the user to adjust the degree of telescopic positioning of the assemblies 3 and 4 and thereby changing the length between the power head 8 and the cutting head 7. The blade 6 is formed with upper teeth 17 and lower teeth 17a on the opposite edges of the blade 6, with trimming apparatus held by the handle and the apparatus extended upwardly. The blade 6 is oriented in an essentially vertical plane. When cutting a limb 2 from the top side, the lower teeth 17a of the blade 6 rests on the limb and moves with a reciprocating motion for cutting the limb 2. When cutting from the underside of the limb 2, the upper teeth 17 are manually forced into abutting and cutting engagement with the underside of the limb.

The switch unit 13 provides for selective connection of power from an incoming power line 18 to the motor 14. The switch unit 13 includes any suitable switch structure 19 shown in block diagram, connected to a motor power cable 20 having a releasable connector for connection to power line, not shown. The present invention is particularly directed to the construction of the power head 8, the cutter head 7 and the sliding coupling 5 which join assemblies 3 and 4 and particularly connects telescopic housing unit including housings 21 and 22 and an internal telescopic drive unit including shafts 9 and 10.

Figure 2:
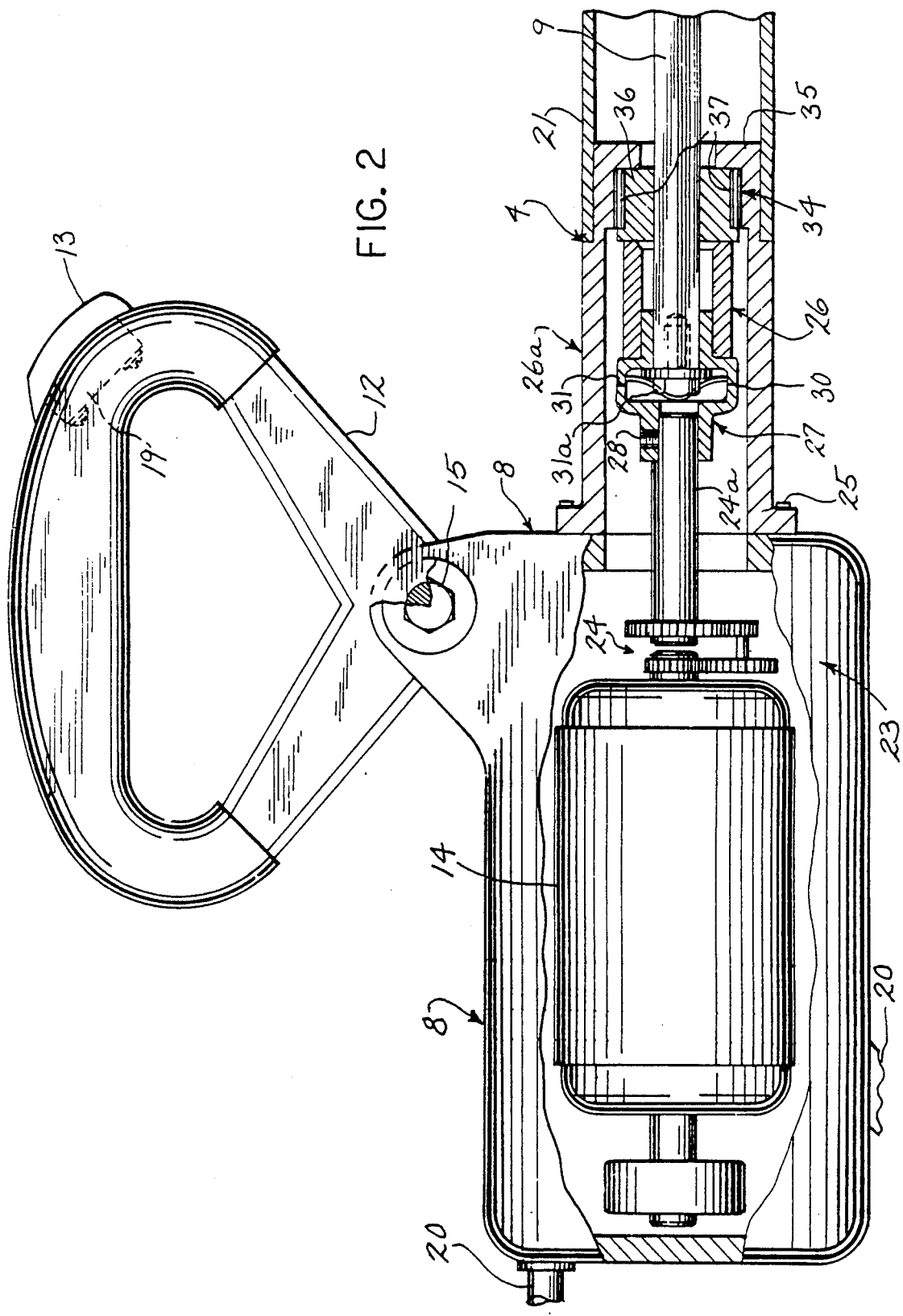
FIG. 2 is an enlarged fragmentary view illustrating the lower power head unit of the tree trimming apparatus shown in FIG. 1 and with parts broken away and sectioned.

Referring particularly to FIG. 2, an enlarged side elevational view of the power head unit 8 is illustrated, with parts broken away and sectioned. The power head 8 includes a generally rectilinear housing 23 with motor 14 mounted therein. A gear reduction unit 24 interconnects the output shaft of the motor 14 to a stub shaft 24a. A slip clutch unit 26 connects or couples the stub shaft 24a to the drive shaft 9 to establish an automatic torque limit connection. The stub shaft is a relatively short member which projects outwardly through an end opening in the motor housing 23. The stub terminates within a small coupling housing 26a which is secured to and projects outwardly from the motor housing 23. The end of housing 21 of the assembly 3 is fixed to the coupling housing 26a. The outer end of the housing 26a has a reduced cross sectional portion and may be press-fitted or otherwise firmly affixed within the housing.

Clutch unit 26 includes a clutch body 27 having a hub 28 telescoped over the stub shaft 24a and the shaft and hub having mating flats with a set screw firmly interconnecting of the members as at 29. The central portion of clutch housing is enlarged to the clutch mechanism connecting the stub shaft to shaft 9. The inner wall 30 of the housing forms a clutch plate 31 of assembly 3. A clutch plate 31 is bolted to the end of the shaft 9 by an end bolt 31a. A clutch spring 32, shown as a tubular, resilient member such as an elastomeric member, is secured within the housing and urges the plate 31 into a frictional engagement with the clutch wall or plate 30 of the housing to establish frictional driving engagement. If the load on the shaft 9 increases beyond the friction level established by the spring 32, the clutch plate 30 slips relative to plate 31 allowing the motor to operate without overloading thereof.

The clutch assembly or unit is stablized within the housing 26a by a support tube and a radial pin roll bearing. The outer race 35 of bearing 34 is secured within the outer clutch housing 26a and provides support for the end of shaft 9 and the clutch housing 29. The end of shaft 9 projects into the clutch housing or body 29 and is a circular member and which can rotate freely within the clutch body. The shaft 9 is otherwise formed of a hexagonal configuration and is coupled to the inner race 36 by corresponding opening configuration in race 36. Needle bearing 37 are located between the inner and outer races. The shaft 9 is supported by the bearing unit 34 within the outer clutch housing 26a of the assembly 3.

The clutch assembly is thereby firmly mounted within assembly 3 at the location of maximum motor torque and provides a stable transfer of the torque forces to the shaft 9.

The shaft 9 and the outer housing 21 extend outwardly to the coupling 5 and joined thereby to corresponding members of the telescopic assembly 4.

Referring to FIGS. 3–5, the adjustable coupling 5 includes an outer cylindrical tube 38 having a first portion telescoped over the housing 21 of assembly 3. Tube 38 is secured to the housing 21 along the interface, as at 39. An enlarged portion of tube 38 projects outwardly in telescopic relation over and in sliding engagement with the housing 22 of assembly 4, as at 40. The portion of the tube 38 slidably engaging the housing 22 includes a slot 41. 4 includes a support for the pivot for the locking lever. An eccentric cam member 42 on the end of lever 15 is pivoted within the slot 41 by a pin 43. The pin 43 is located off center to the cam surface 44 of the eccentric cam member 42 such that opposite pivoting of the lever 15 on pin 43 rotates a long radius portion of member 42 to and from engagement with the housing 22 of assembly. The engagement of the long radius portion locks the tube 38 to housing 22, and thereby sets the extension of assemblies 3 and 4. Rotation of lever 15 and member 42 to align a short radius portion with the housing 22 releases the connection and permits manual adjustment of the extension of assemblies 3 and 4.

The shaft 9 projects into the coupling 5 and is interconnected by a pin roller bearing unit 45 to the tubular shaft 10 of assembly 4. Pin roller bearing unit 45 includes an inner race 46 slidably mounted over the end of the shaft 9. The opening of the inner race 46 is hexagonal and conforms to the hexagonal configuration of the shaft 9 and locks the members together for simultaneous rotation.

The outer surface of the inner race 46 includes a tubular extension projecting inwardly into the shaft 10 with a firm interconnection therebetween, as at 47. The inner race 46 is thereby secured to and moves with the tubular shaft 10.

The inner end of the shaft 9 protrudes outwardly from the tubular extension 47 of the inner race 46. A guide member 48 is secured to the end of shaft 9 by an end screw 48a. The guide 48 has a slightly cup-shaped configuration and telescopes over the end of the shaft 9 into abutting engagement with the end of the inner race extension 47'. This limits the relative movement between the shafts 9 and 10 and provides a maximum shaft extension.

Needle bearings 50 are interposed between the inner race 46 and an outer race 51 to provide a low friction support of the interconnected shafts 9 and 10. The outer race 51 has an outer stepped surface with a large diameter portion abutting the outer surface of the housing 22 of assembly 4. The outer race 51 is secured to the housing 22 along the interface 52 and provides fixed support for the bearing assembly. The outer bearing race 51 has an outer diameter corresponding to the inner diameter of the housing 21 of assembly 3, with a sliding interface 53.

The securement of the outer bearing race 51 to the outer assembly 4 in combination with the sliding engagement with the inner diameter of the inner housing assembly 3 permits the telescopic movement of the housing assemblies 2 and 4.

The pin bearing unit 46 provides a fixed connection of the outer housing 22 of the housing section or assembly 4 and the tubular shaft 10 of the shaft section, for simultaneous and corresponding movement with the bearing. The bearing unit 46 also provides a sliding engagement with the outer housing 21 of assembly 3 and with the inner shaft 9 of the assembly 3. The pin rollers 50 provide a low friction and high efficiency transfer of the torque from the driving shaft 9 to the tubular driven shaft 10. The bearings, housing and shaft can be formed with a low friction sliding support. Further, the degree of sliding motion is minimal and can be readily constructed to provide a long operative life.

The outer cap member 48 on the shaft 9 also serves to stablize the shaft connection with the assemblies 3 and 4 telescoped to shorten the length of the tree trimming apparatus. The outer diameter of the cap 48 slidably engages with the inner diameter of the outer tubular shaft 10 and in the extended position, shown in FIG. 3, supports the outer end of the shaft 9. The coupled assembly provides a stable and reliable coupling in all positions and thereby permits adjusting the extension of the assembly while providing efficient energy transfer from the power head 8 and shaft assembly to the cutting head 6.

In addition, the illustrated releasable coupling unit 5 permits unrestricted rotation of the cutter head unit 7 the interconnected and housing 4 about the power head unit 8 and the interconnected lower housing 3. The operator can therefore set the cutting blade at different angles to the lower unit and therefore, to the limit for proper cutting of the limb from the tree trunks or other limb.

The cutting head 7, as previously noted, includes a rotary-to-linear coupling for interconnecting of shaft 10 to the blade 6.

Referring particularly to FIGS. 1, 6 and 7, the cutting head 7 includes a generally L-shaped housing 56 having a tubular connector 57 telescoped over the outer housing 22 of assembly 4 and rigidly affix thereto as by a press fit or other securement element to form an extension thereof throughout the interface 58. The rotary-to-linear motion coupling 11 includes a support shaft, the outer end of which projects into and is secured to the tubular shaft 10 along its interface. Shaft 59 includes an enlarged shaft portion 60 which extends from the shaft 10 and includes a cylindrical bearing 61 in the housing 56.

The shaft 60 projects inwardly with a rotating cam 63 formed on the inner end of the shaft 60. The cam 63 is located within the the L-shaped housing 56, which extends laterally from assembly 4 into alignment with the offset reciprocating blade 6. The cam 63 has a peripheral groove 66 defined by a pair of axially spaced parallel cam walls 64 and 65. As most clearly shown in FIG. 6, the cam walls 64 and 65 each include radial offset portions on diametrically opposite sides of the shaft 10 and are interconnected by essentially straight inclined portions. A roll follower cam 67 is secured to the reciprocating blade 6 and supported within the cam groove 66. The rotation of the cam 63 with the offset portion provides a straight line motion to the roller 67 which is transmitted directly to the cutting blade as follows.

A blade connector 68 includes a bifurcated plate member 69 secured to the blade 6 at one end and to the roller 67 by a connecting stub pin 70 at the opposite end. Pin 70 projects radially from the connector 68 into roller 67. Shaft 68 is slidably mounted in a linear sleeve bearing 71 secured within the connecting and outwardly extending leg portion 72 of the L-shaped housing. The connector 68 is especially formed with a semicircular bottom portion 73, a pair of chordal side walls 74 and an outer or upper circular bearing portion 75. A pair of guide walls 74a of portion 72 engage the walls 74 to prevent rotation of connector 68.

Bearing 71 and connector 68 have complementing surfaces which prevent rotation of connection 68 while providing low friction, sliding support of the connector. The shaft is thereby mounted for linear movement with the roller 67 and transmits such motion to the blade 6 within a generally flat outer portion of the L-shaped housing.

The bifurcated block plate 69 includes a slot 76 within which the one end of blade 6 is located. Connecting bolts 77 pass through vertically spaced and aligned openings and firmly attach the blade 6 to the reciprocating plate 69 for corresponding movement in response to the rotation of the cam unit coupling 11.

The cutting edges or teeth 17 and 17a are located on the top and bottom edges of the blade 6. The cutting teeth 17 and 17a are oriented for maximum cutting efficiency when pulling of the blade 6 toward and into the housing.

The outer end face of the L shaped housing overlaps the blade 6 and is located immediately adjacent to the innermost cutting teeth 17 and 17a with the blade 6 in the fully extended position as shown in FIGS. 1 and 6. Referring to FIG. 1, the end of the face is especially curved with a concave upper face 78 located adjacent to the upper edge of blade teeth 17. A convex lower face 79 portion is located projected downwardly from the lower cutting teeth 17a. The upper concave portion allows the movement of the unit 1 into cutting engagement with the limb 2 with the uppermost concave edge resting against the limb. The upper convave portion locates the blade 6 in cutting engagement with the underside of the limb 2. The bottom convex face 79 conversely allows the blade 6 to rest on the upper or side portion of the limb 2 without interference from the housing.

In summary, the operator in using the tree cutting apparatus 1, releases the coupling lever 16 and the eccentric 44 for adjustment of the extension of assembly 4 relative to assembly 3 to a desired length. The apparatus 1 with the flat end wall on the power head 8 may be rested on its lower end during the extending and retracting of the cutting head. A bumper may be secured to the flat end wall of housing 23 to protect the housing. The user, in addition to positioning the extension of the head, angular orientation of the head and blade 6 relative to the handle 12, may be set for an angle cut of the limb. After setting of assembly 4 and head 8, the lever 15 is closed to lock the assemblies 3 and 4 in fixed relation. The adjustment of the housing extension to less than the full extension moves the lower housing 21 and coupling housing 38 and the inner end of the shaft 9 of assembly 3 outwardly with respect to assembly 4, as shown in phantom in FIG. 4. The bearing 46 moves inwardly into the housing 21 of assembly 3. The pin roller bearing 42 maintains the firm relationship between the shafts 9 and 10 and the housings 21 and 22 while the coupling housing 38 and the cap 48 provide a firm support of the sliding elements at the outer end of assembly 3.

The operator pivotally sets the handle 12 relative to the tree trimming apparatus 1 with handle in a convenient horizontal support position and with the tree trimming apparatus projecting upwardly at the desired angle for engagement with limb 2.

Upon limb engagement, the switch operator 13 is moved to energize the motor 14 and effect a cutting operation. The total assembly can be readjusted as required or most convenient and comfortable rapid cutting of tree limbs.

The present invention provides a tree trimming apparatus which is convenient to use with effective cutting of the tree limbs. The combination of the several separate features of the invention including the high torque power head, the bearing coupling and the reciprocating blade cutting head provides an optimum trimming apparatus. Various modifications may be made to the illustrated embodiment of the invention and are within the scope of the claims, which particularly define the invention covered herein. By way of example, and not by limitation, a rotating cutting blade can be used with the bearing coupling or the pin roll bearings may be replaced with suitable roller bearings or the like.

Various modes of carrying out the invention are contemplated as being within the scope of the following claims particularly pointing out and distinctly claiming the subject matter which is regarded as the invention.

I claim:

1. An extendible tree trimming apparatus for manual manipulation and cutting of tree limbs, comprising an extendible power transmitting tubular unit having an upper end and a lower end, a power head secured to the lower end of said unit, a cutting blade unit connected to the upper end of said unit, said tubular unit includes a first assembly including a first outer tubular housing and a first shaft extending through said first housing, said first assembly having a lower end connected to said power head unit and including a separate connection of said first outer tubular housing and said first shaft to said power head unit, said tubular unit including a second assembly including a second outer tubular housing telescoped with said first outer tubular housing and a second shaft extending through said second housing and telescoped with said first shaft, said second assembly extending outwardly from said first assembly, said cutting blade unit being connected to said second outer tubular housing and having a blade connected to said second shaft, means releasably interconnecting said first housing to said second housing for locking of the first and second assemblies in telescoped position, a roller bearing coupling unit located within said first and second assemblies said roller bearing coupling unit including a roller bearing unit having an outer race secured to one of said first and second housings and having an inner race connected to the shaft of said housing secured to the outer race, and said roller bearing coupling unit including an interposed plurality of rotating bearing members between said outer race and said inner race and rotatably supporting said shaft on said housing secured to the outer race, said outer race and said inner race being slidably engaged with said housing not secured to the outer race and said shaft of said housing not secured to said outer race and thereby said first and second assemblies being slidably mounted to each other by said roller bearing coupling unit.

2. The apparatus of claim 1 wherein said power head includes an electric motor, a gear reduction unit connected to the motor, and a slip clutch unit connecting the gear reduction unit to said first shaft.

3. The apparatus of claim 1 wherein said cutter head includes a rotating cam unit secured to said second shaft and said blade, said cam unit including a cam member with a peripheral groove having axially offset portions defining an axially moving path, a follower located in said groove and moving axially in response to rotation of said cam member.

4. The apparatus of claim 3 wherein said cutter head includes a housing having a shaft and having sliding means connecting said blade to said follower, and means connecting said cam member to said second shaft.

5. The apparatus of claim 3 wherein said blade is a flat metal plate connected to said follower for reciprocation in the plane of the blade, said blade having teeth on the opposed longitudinal edges, said teeth being shaped to cut with said cutting blade moving toward the second housing.

6. The apparatus of claim 3 wherein said cutting unit includes a supporting housing connected to said second housing, said cutter head having an end face in a generally S-shaped configuration adapted to be located in a vertical plane with a top portion of said end face being concave and a lower portion being convex whereby the upper portion is adapted to rest on a limb with the blade engaging the underside of the tree limb and said lower portion is adapted to abut a limb with the lower edge of the blade resting on a tree limb.

7. The apparatus of claim 1 wherein said roller bearing unit is a needle bearing, said inner race having a central opening with at least one flat coupling surface for sliding coupling to said shaft of the said housing not secured to the outer race, said last named shaft having a corresponding flat coupling surface and extending through said bearing, and including an enlarged outer guide head releasably secured to said last mentioned shaft.

8. The apparatus of claim 7 wherein said inner bearing race includes an outer coupling wall projecting between said shafts and connecting said shafts for simultaneous rotation therewith, and said outer race having a stepped outer surface portion including a first inner diameter portion and a second outer diameter portion, said stepped outer surface portion projecting between said housings of said first and second assemblies.

9. The apparatus of claim 1 wherein said power head unit includes an outer housing fixedly connected to said first tubular housing and extending longitudinal of said tubular housing, a motor unit mounted within said power head outer housing, a handle member secured to the top side of said housing for holding of said motor housing in a vertical orientation beneath said handle, a pivot connection connecting said handle to said housing and having an axis located transversely of said tubular housing whereby said handle is adapted to be located in a horizontal holding position with the power head housing and extendible tubular unit extending angularly upwardly from said handle.

10. An extendible tree trimming apparatus for cutting of tree limbs, comprising an extendible power transmitting tubular unit having a lower end and an upper end, a power head secured to the lower end of said unit, said tubular unit includes a first assembly including a first outer housing and a first shaft concentrically mounted within said first housing, said power head unit connected to said first outer housing and connected to said first shaft to rotate said shaft, said tubular unit including a second assembly including a second outer housing telescoped with said first outer housing and a second shaft concentrically mounted within said second housing and telescoped with said first shaft and coupled to rotate with said first shaft, a cutting blade unit connected to said second outer housing, means releasably interconnecting said first and second housings for locking of the first and second assemblies in telescoped position, a coupling unit located with said first and second housings and coupled to said shafts to support the shafts in spaced relation to said housings, said cutting blade unit including a blade mounted for reciprocating movement, a rotating cam unit secured to said second shaft and said blade, said cam unit including a cam member with a peripheral groove having axially offset portions defining an axially moving path, a follower located in said groove and moving axially in response to rotation of said cam member, said blade being a flat metal plate connected to said follower for reciprocation in the plane of the blade, said blade having teeth on the opposed longitudinal upper and lower edges, said teeth being shaped to cut with said cutting blade moving toward the second housing, and wherein said cutting blade unit includes a supporting housing connected to said second outer housing of said tubular unit and projecting outwardly from said second outer housing and having the blade projecting from an outer end face of said supporting housing, said outer end face having a generally S-shaped configuration located in a vertical plane and with a top portion of said end face being concave and a lower portion of said face being convex whereby the top portion is adapted to rest on a limb with the upper edge of said blade engaging the underside of the tree limb and said lower portion is adapted to abut a limb with the lower edge of the blade resting on a tree limb.

11. An extendible tree trimming apparatus for cutting of tree limbs, comprising an extendible power transmitting tubular unit, a power head secured to the lower end of said unit, said tubular unit includes a first assembly including a first outer housing and a first inner shaft concentrically mounted within said first housing, said power head unit connected to said first outer housing and connected to said first shaft to rotate said shaft, said tubular unit including a second assembly including a second outer housing telescoped with said first outer housing and a second shaft concentrically mounted within said second housing and telescoped with said first shaft and coupled to rotate with said first shaft, a cutting blade unit connected to said second outer housing, means releasably interconnecting said first and second housings for locking of the first and second assemblies in telescoped position, coupling unit located with said first and second housings and coupled to said shafts to support the shafts in spaced relation to said housings, said cutting blade unit including a blade mounted for reciprocating movement, a rotating cam unit secured to said second shaft and said blade, said cam unit including a cam member with a peripheral groove having axially offset portions defining an axially moving path, a follower located in said groove and moving axially in response to rotation of said cam member, and wherein said coupling unit includes a needle bearing having an inner race and an outer race with interposed bearing needles therebetween, said inner race having a central opening with at least one flat coupling surface, said first shaft having a corresponding flat coupling surface and extending through said central opening and including an enlarged outer guide head releasably secured to said first shaft, said inner bearing race having an outer coupling wall projecting from the bearing needles, said second shaft is a tubular shaft secured to said inner race for connecting said tubular shaft to said first shaft for simultaneous rotation therewith, and said outer race having a stepped outer surface portion including a first diameter portion and a second diameter portion, said second housing secured to said first diameter portion and projecting outwardly concentrically of said tubular shaft, said first housing slidably engaging said second diameter portion and extending outwardly therefrom concentrically with said first shaft.

12. An extendible tree trimming apparatus for cutting of tree limbs, comprising an extendible power transmitting tubular unit having an upper end a lower end, a power head secured to the lower end of said unit, said tubular unit includes a first assembly including a first outer housing and a first inner shaft, said power head connected to said first outer housing and connected to said first shaft to rotate said shaft, said tubular unit including a second assembly including a second outer housing telescoped with said first outer housing and a second shaft concentrically mounted within said second housing and telescoped with said first shaft and coupled to rotate with said first shaft, means releasably interconnecting said first and second housings for locking of the first and second assemblies in telescoped position, coupling unit located with said first and second housings and coupled to said shafts to support the shafts in spaced relation to said housings, a cutting blade unit includes a supporting housing connected to said second housing of said telescopic sections and said blade unit having a blade projecting from an outer end face of said housing with a top cutting edge and a bottom cutting edge, said supporting housing of said cutting blade unit having an end face in a generally S-shaped configuration oriented in a vertical plane with an upper portion and lower portion, the upper portion of said end face being concave and the lower portion of said end face being convex whereby the upper portion is adapted to rest on a limb with the top edge of the blade engaging the underside of the tree limb and said lower portion is adapted to abut a limb with the lower edge of the blade resting on a tree limb.

* * * * *

UNITED STATES PATENT AND TRADEMARK OFFICE
CERTIFICATE OF CORRECTION

PATENT NO. : 4,991,298

DATED : February 12, 1991

INVENTOR(S) : DANIEL A. MATRE

It is certified that error appears in the above-identified patent and that said Letters Patent is hereby corrected as shown below:

Claim 12, column 11, line 9, after "end" insert -- and --.

Signed and Sealed this

Eleventh Day of August, 1992

*Attest:*

DOUGLAS B. COMER

*Attesting Officer*     *Acting Commissioner of Patents and Trademarks*